United States Patent
Gong

(10) Patent No.: US 11,868,808 B2
(45) Date of Patent: Jan. 9, 2024

(54) AUTOMATIC DRIVING SIMULATION TASK SCHEDULING METHOD AND APPARATUS, DEVICE, AND READABLE MEDIUM

(71) Applicant: INSPUR SUZHOU INTELLIGENT TECHNOLOGY CO., LTD., Jiangsu (CN)

(72) Inventor: Zhan Gong, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 62 days.

(21) Appl. No.: 18/011,139

(22) PCT Filed: Jul. 30, 2021

(86) PCT No.: PCT/CN2021/109506
§ 371 (c)(1),
(2) Date: Dec. 16, 2022

(87) PCT Pub. No.: WO2022/062648
PCT Pub. Date: Mar. 31, 2022

(65) Prior Publication Data
US 2023/0176905 A1    Jun. 8, 2023

(30) Foreign Application Priority Data
Sep. 27, 2020   (CN) .......................... 202011031512.6

(51) Int. Cl.
*G06F 9/48*   (2006.01)
(52) U.S. Cl.
CPC .................. *G06F 9/4881* (2013.01)

(58) Field of Classification Search
CPC .................................................... G06F 9/4881
See application file for complete search history.

(56) References Cited

U.S. PATENT DOCUMENTS

2009/0268605 A1* 10/2009 Campbell ............... H04L 41/12
370/254
2018/0131979 A1   5/2018 Bayoumi et al.

FOREIGN PATENT DOCUMENTS

| CN | 106126344 A | 11/2016 |
|---|---|---|
| CN | 106708625 A | 5/2017 |
| CN | 107942720 A | 4/2018 |
| CN | 109819046 A | 5/2019 |

(Continued)

OTHER PUBLICATIONS

PCT/CN2021/109506 international search report.
CN 202011031512.6 first office action and search report.

*Primary Examiner* — Wissam Rashid
(74) *Attorney, Agent, or Firm* — IPRO, PLLC

(57) ABSTRACT

An automatic driving simulation task scheduling method and apparatus, a computer device, and a readable storage medium. The method includes: constructing a network flow block diagram on the basis of the number of cluster racks, the number of nodes, and the number of processes, and coding information of the network flow block diagram (S01); setting information of a task to be simulated, and performing shortest path computation on a simulation task flow by means of the network flow block diagram (S02); and updating the state of a scheduling system in real time according to a fair policy and a preemptive scheduling policy, and executing scheduling on the basis of the state of the scheduling system (S03).

20 Claims, 2 Drawing Sheets

(56) References Cited

FOREIGN PATENT DOCUMENTS

| | | | |
|---|---|---|---|
| CN | 110532078 | A | 12/2019 |
| CN | 111506401 | A | 8/2020 |
| CN | 112213956 | A | 1/2021 |
| WO | 2008007435 | A1 | 1/2008 |

* cited by examiner

AUTOMATIC DRIVING SIMULATION TASK SCHEDULING METHOD AND APPARATUS, DEVICE, AND READABLE MEDIUM

The application claims the priority of the Chinese patent application filed on Sep. 27, 2020 before the CNIPA, China National Intellectual Property Administration with the application number of 202011031512.6, and the title of "AUTOMATIC DRIVING SIMULATION TASK SCHEDULING METHOD AND APPARATUS, DEVICE, AND READABLE MEDIUM", which is incorporated herein in its entirety by reference.

FIELD

The present disclosure relates to the technical field of artificial intelligence, in particularly relates to an automatic driving simulation task scheduling method, apparatus, device and a readable medium.

BACKGROUND

With the rapid development of science and technology, the rapid iteration of autonomous vehicle technology is promoted, and the autonomous vehicle needs to conduct a large number of mileage tests before mass production to ensure the safety of its driving domain. According to the calculation of the research institutes, on the condition that the tests are all the real vehicle road tests, even if thousands of vehicles are used for road testing, it will take several decades to complete the corresponding test tasks, so it is not practical to use all the real vehicle road tests. The current strategy of the industry is to replace the real vehicle road tests with simulation calculation through 3D simulation of the test environment; since the machine may employ cluster expansion, the completion of test tasks may be expedited. At present, however, the automatic driving simulation tasks are various and diverse, involving different scenarios, traffic flow, participants, sensor configuration, brand vehicles, etc. When a large number of tasks are simulated and calculated, using the traditional queue cluster scheduling system will result in low utilization efficiency of cluster resources, significantly increase the cost of research and development and reduce research and development efficiency.

According to the prior art solution, a set of queues is used as a basic data structure of a cluster scheduler to achieve scheduling of tasks. The widely used container clustering orchestration tools Swarm, Kubernetes, etc. apply this architecture on their own scheduler. The queue framework of the prior art has a simple structure and may not set more complex scheduling strategies, which results in that it is difficult for the decision of the queue framework to obtain a global optimal solution and often only a local optimal solution is obtained. Thus, the resources of the cluster are not fully utilized. On the other hand, the current scheduling system is a more general framework, without customized optimization for the characteristics of automatic driving simulation tasks.

SUMMARY

In view of this, it is an object of an embodiment of the present disclosure to provide an automatic driving simulation task scheduling method, apparatus, device and a readable medium, the graph is used as the abstraction of cluster network to add more information to associate each node with the automatic driving simulation task, and the cluster scheduling problem is abstracted as the solution of minimum cost flow in the flow network, so as to obtain a better global scheduling decision, and designs a fairness strategy and a preemptive scheduling in combination with the characteristics of an automatic driving simulation task, so as to improve the use efficiency of cluster resource and greatly accelerate the automatic driving simulation test. It is to solve the problem that when scheduling of automatic driving simulation tasks by the queue framework, complex scheduling strategy may not be set for complex and changeable simulation tasks, an optimization solution for cluster resource scheduling is obtained to improve the research and development efficiency.

Based on the above objects, in one aspect, the embodiment of the present disclosure provides an automatic driving simulation task scheduling method, including: constructing a network flow block diagram based on a cluster rack, a quantity of nodes and a quantity of processes, and encoding information of the network flow block diagram; setting information of tasks to be simulated, and performing simulation task flow minimum path calculation via the network flow block diagram; and updating a scheduling system state in real time according to a fairness strategy and a preemptive scheduling strategy, and scheduling based on the scheduling system state.

In some embodiments of the present disclosure, the network flow block diagram is configured such that a flow in the network begins at a vertex representing a task, passes through a plurality of directed edges representing the flow and edge costs, and a plurality of intermediate nodes representing jobs or physical machines, and finally enters a sink.

In some embodiments of the present disclosure, the constructing a network flow block diagram based on a cluster rack, a quantity of nodes and a quantity of processes includes: setting a root process node, a plurality of work process nodes and an unscheduled task node for each job, setting a computer node for each computer, and setting a rack node for each rack; and connecting the plurality of work process nodes and the unscheduled task node and the computer node and the rack node by directed edges.

In some embodiments of the present disclosure, the encoding the information of the network flow block diagram includes: encoding the cluster rack, a computer node and a process node in the network flow block diagram; and encoding the cost and weight of the directed edges in the network flow block diagram.

In some embodiments of the present disclosure, the setting information of tasks to be simulated includes: allocating flow to the directed edges such that a sum of the flow input by the plurality of intermediate nodes is equal to a sum of the flow output by the plurality of intermediate nodes; and setting a directed edge assignment cost weight according to scenarios, participants and sensor configurations of the automatic driving simulation task.

In some embodiments of the present disclosure, the performing simulation task flow minimum path calculation via the network flow block diagram includes: obtaining a minimum feasible flow solution based on a cost-scalable push-relabel algorithm, and a sum product of a flow cost of an output edge of the minimum feasible flow solution is minimum.

In some embodiments of the present disclosure, the updating a scheduling system state in real time according to a fairness strategy and a preemptive scheduling strategy, and scheduling based on the scheduling system state includes: making the high-priority tasks preferentially occupy resources according to the preemptive scheduling strategy; and setting an instantaneous resource allocation for a same-level priority tasks without preempting the resources of the same-level priority tasks according to the fairness strategy.

In another aspect, the embodiments of the present disclosure further provides an automatic driving simulation task scheduling apparatus, including: a construction module configured to construct a network flow block diagram based on a cluster rack, a quantity of nodes and a quantity of processes, and encode information of the network flow block diagram; a calculation module configured to set information of tasks to be simulated, and perform simulation task flow minimum path calculation via the network flow block diagram; and a scheduling module configured to update a scheduling system state in real time according to a fairness strategy and a preemptive scheduling strategy, and scheduling based on the scheduling system state.

In yet another aspect, the embodiments of the present disclosure further provides a computer device, including: at least one processor; and a memory for storing computer instructions executable on the processor which when executed by the processor, carry out operations of the method described above.

In yet another aspect, the embodiments of the present disclosure further provides a computer-readable storage medium, storing a computer program which when executed by a processor, carries out operations of the method described above.

The present disclosure has the following advantageous technical effects: the graph is used as the abstraction of cluster network to add more information to associate each node with the automatic driving simulation task, and the cluster scheduling problem is abstracted as the solution of minimum cost flow in the flow network, so as to obtain a better global scheduling decision, and designs a fairness strategy and preemptive scheduling in combination with the characteristics of an automatic driving simulation task, so as to improve the use efficiency of cluster resource and greatly accelerate the automatic driving simulation test. It is to solve the problem that when scheduling of automatic driving simulation tasks by the queue framework, complex scheduling strategy may not be set for complex and changeable simulation tasks, an optimization solution for cluster resource scheduling is obtained to improve the research and development efficiency.

BRIEF DESCRIPTION OF THE DRAWINGS

In order to more clearly explain the embodiments of the present disclosure or the technical solutions in the prior art, the following will briefly introduce the drawings needed to be used in some embodiments or the prior technical description. Obviously, the drawings in the following description are only some embodiments of the present disclosure. For those skilled in the field, they may also obtain other embodiments according to these drawings without paying creative labor.

DETAILED DESCRIPTION OF THE EMBODIMENTS

In order to make the purpose, technical solutions and advantages of the present disclosure clearer, the embodiments of the present disclosure are further described in detail below in combination with specific embodiments and with reference to the drawings.

It should be noted that all expressions of "first" and "second" in some embodiments of the present disclosure are used to distinguish two entities with the same name but not the same or different parameters. It shows that "first" and "second" are only for the convenience of expression, and should not be understood as limiting the embodiments of the present disclosure, and subsequent embodiments will not explain them one by one.

Figure 1:
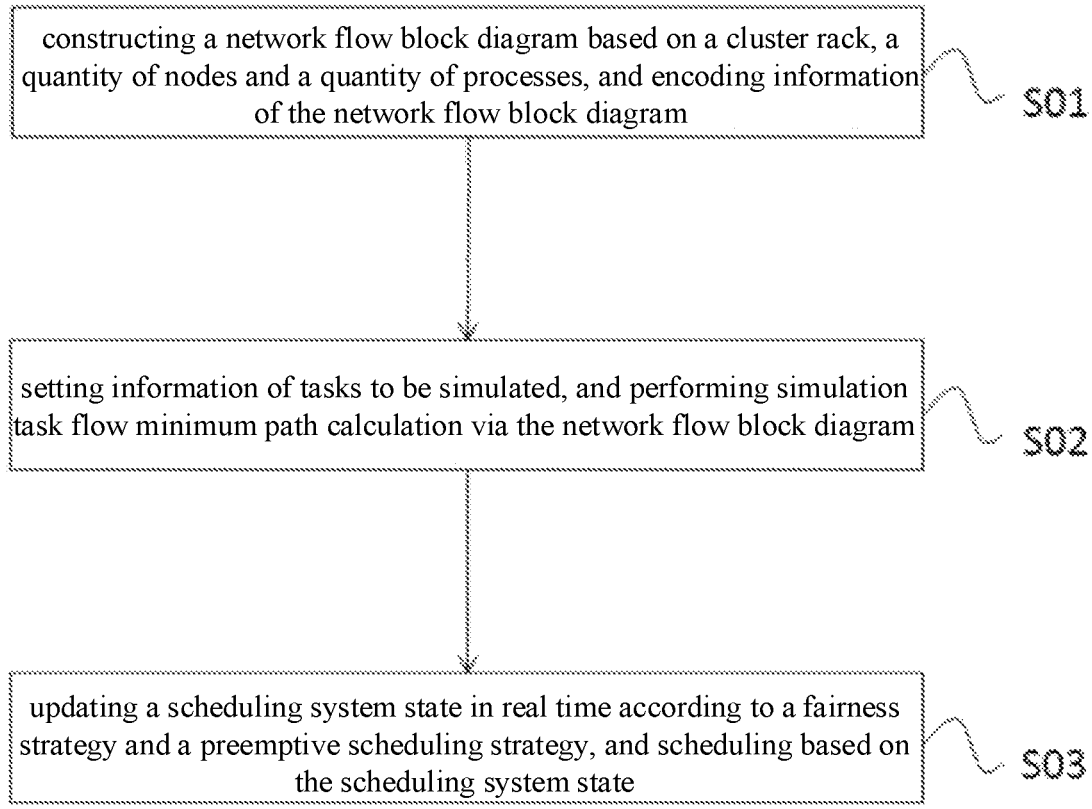
FIG. 1 is a schematic diagram of an embodiment of an automatic driving simulation task scheduling method according to the present disclosure.

Based on the above object, a first aspect of an embodiment of the present disclosure proposes an embodiment of an automatic driving simulation task scheduling method. FIG. 1 is a schematic diagram illustrating an embodiment of an automatic driving simulation task scheduling method according to the present disclosure. As shown in FIG. 1, an embodiment of the present disclosure includes the following operations:

S01, constructing a network flow block diagram based on a cluster rack, a quantity of nodes and a quantity of processes, and encoding information of the network flow block diagram;

S02, setting information of tasks to be simulated, and performing simulation task flow minimum path calculation via the network flow block diagram; and S03, updating a scheduling system state in real time according to a fairness strategy and a preemptive scheduling strategy, and scheduling based on the scheduling system state.

In some embodiments, a graph data structure is first designed to encode the structure of the cluster network and the waiting simulation task set and their information, and to allocate corresponding weights and capacities on the edges of the graph. Then, a minimum cost flow calculation algorithm is designed to get an immediate scheduling task set which satisfies the global criteria. Finally, combined with the characteristics of the automatic driving simulation task, the fairness strategy and preemptive scheduling are designed, the constraint of the scheduling task set is modified, and the scheduling is completed according to the solved scheduling task set, which may greatly improve the resource utilization efficiency, reduce the cost and improve the efficiency of research and development.

In some embodiments, taking a small cluster with 4 nodes and evenly distributed in two racks as an example, firstly, inputting parameters such as cluster racks, the quantity of nodes and the quantity of processes available for calculation into a graph network flow frame scheduling program to complete graph network construction; setting information of tasks to be simulated (simulation scenarios, simulation participants, sensor information, etc.) via a configuration file, and executing a minimum cost flow calculation program to complete real-time calculation of a scheduled task flow; determining a task priority according to a task to be simulated set in a configuration file of the second step, and updating a real-time state of a scheduling system according to a fairness strategy and preemptive scheduling; and executing scheduling. According to the above-mentioned operations, a simple example of automatic driving simulation task scheduling based on graph network flow may be realized, and tests show that: compared with queue scheduling, testing a group of decision control simulation tasks, the utilization of cluster central processing unit (CPU) reduces resource consumption by about one third. With preemptive scheduling enabled, the same test tasks, bandwidth and CPU resource utilization are decreased by about 10% compared with without pre-emptive scheduling.

In some embodiments of the present disclosure, in a network flow block diagram, the network flow block diagram is configured such that a flow in the network begins at a vertex representing a task, passes through a plurality of directed edges representing the flow and edge costs, and a plurality of intermediate nodes representing jobs or physical machines, and finally enters a sink.

In some embodiments, a set of graph-based network flow frame is designed and defined to transform the cluster scheduling problem into the network flow allocation problem. The flow in the network starts at the vertex, goes through a series of directed edges and intermediate nodes, and finally enters the sink. The vertex represents the task, the intermediate node represents the job and the physical machine, and the directed edge represents the cost of the simulation task and the cost of the computing process, etc., in this way, the cluster scheduling is abstractly evolved into the network flow allocation problem. In some embodiments, the present disclosure defines that: R represents a root process of a job, W represents a work process under the root process, U represents an unscheduled task, a cluster is represented as X, a computer m in the cluster is represented as $C_m$, and a rack i is represented as $R_i$. Each directed edge in the flow network graph is designed with its own two variables, capacity and edge cost, the capacity is used to limit the flow of the simulation task flow through each edge for cost calculation. The edge cost is mainly used to constrain the simulation task according to the actual environment.

In some embodiments, the cost on the edge connected to $U_j$ represents W's unscheduled penalty. This cost increases over time, making long queued jobs more likely to be run than recently submitted jobs. On the condition that a task starts running on the computer m, an additional termination cost is added to the task on its side to all nodes except $C_m$, and the cost increases with time, representing wasted resources when the penalty is forced to kill or move. The outgoing edge of each computer is provided with unit capacity to allocate the maximum and minimum number of computers for running any simulation task by controlling the capacity between U and S.

In some embodiments of the present disclosure, the constructing a network flow block diagram based on a cluster rack, a quantity of nodes and a quantity of processes includes: setting a root process node, a plurality of work process nodes and an unscheduled task node for each job, setting a computer node for each computer, and setting a rack node for each rack; and connecting the plurality of work process nodes and the unscheduled task nodes and the computer nodes and the rack nodes via the directed edges.

In some embodiments, each job j has a root process node r, a plurality of work process nodes $W_j$, and an unscheduled task node $U_j$. Each computer m has a node $C_m$ and each rack i has a rack node $R_i$. S is the sink node where all flows exit from the graph. Each work task in the job j has an edge connection to the unscheduled node $U_j$ of j, and each rack and computer in the preference list thereof. A unit flow along an edge of the graph may be considered to correspond to a scheduling assignment of a task, and each submitted work process or root process receives a unit flow as the start and the sink node S on the right as the end of the flow.

In some embodiments of the present disclosure, encoding information for a network flow block diagram includes: encoding a cluster rack, a computer node and a process node in a network flow block diagram; and encoding the cost and weight of the directed edges in the network flow block diagram.

The cluster rack, machine nodes, all the work processes that is capable for running, etc. are encoded to realize the architecture of the whole graph. Assuming that an exact number of bytes read by the rack and core switch is given to the computer m in a given work process W. This information is encoded in the graph structure with the cost on each side from the graph node W to the computer node $C_m$, and the rack node $R_i$. The edge cost from W to $C_m$ is implemented as a function that represents the amount of data that would be transmitted through the rack switches and the core switches of m in response to running on computer m. The edge cost from W to $R_i$ is set to be the worst cost that would result from the task running on the least favorable computer in the $i^{th}$ rack. The edge cost from W to X is set to the worst case cost of running a task on any computer in the cluster.

In some embodiments of the present disclosure, setting information of tasks to be simulated includes: allocating flow for the directed edge, so that a sum of the flow input by the plurality of intermediate nodes is equal to a sum of the flow output by the plurality of intermediate nodes; and setting a directed edge assignment cost weight according to scenarios, participants and sensor configurations of the automatic driving simulation task.

In this embodiment, the simulation task flow minimum path computation is performed according to the defined graph network flow frame. Since each edge traversed by the flow has a corresponding cost, the scheduling problem to be solved thus evolves into the problem of solving the path with the minimum cost under a given strategy. A flow network is a directed graph with each edge designed with a non-negative integer capacity and a cost. Each edge on a feasible stream is assigned a non-negative integer stream such that the set of its input edges equals the set of output edges for each node. Among them, the edge cost is used to set and divide the corresponding task cost according to the automatic driving simulation task characteristics, different simulation scenarios, different simulation participants and different Sensor configurations, and so on. For example: a vehicle is added to the set scenario, and the cost weight is increased by a factor of 0.0001; a Sensor is added, the cost weight factor is increased by 0.001, etc. (same Sensor, different resolution, etc. parameter selection, and a certain cost factor floating is further set). The automatic cost evaluation calculation based on the user simulation test task profile is implemented in the graph network framework.

In some embodiments of the present disclosure, the performing simulation task flow minimum path computation through a network flow block diagram includes: obtaining a minimum feasible flow solution based on a cost-scalable push-relabel algorithm, and a sum product of a flow cost of an output edge of the minimum feasible flow solution is minimum.

In some embodiments, a minimum feasible flow solution is set according to the architecture of the clustered machine network even though the sum product of the non-negative integer flow of the output edge and the cost is minimum. A cost-scalable push-relabel algorithm used herein maintains the deviation from the minimum cost flow, and then uses the continuous approximation method to solve the problem. The two basic operations of the algorithm are pushed and relabeled. The push operation is applied to an edge to press the pre-flow of the beginning of the edge into the sink as much as possible. The relabel is applied to a point and the height of the point is set as the minimum value of the heights of all adjacent points plus one. Compared with other algorithms, this algorithm has more advantages in computational complexity.

In some embodiments of the present disclosure, updating a scheduling system state in real time according to a fairness strategy and a preemptive scheduling strategy, and performing scheduling based on the scheduling system state includes: according to the preemptive scheduling strategy, the high-priority tasks are made preferentially occupy resources; according to the fairness strategy, the instantaneous resource allocation is set for the same-level priority tasks, and the resources of the same-level priority tasks may not be preempted.

In some embodiments, based on the characteristics of the automatic driving simulation task, a fairness strategy and preemptive scheduling are designed. Since the automatic driving simulation task is very resource consuming, starting a job for simulation takes up a lot of resources, resulting in other next jobs being slow or waiting due to lack of resource computation, the present disclosure designs a fairness strategy. Each job starts with an instantaneous resource allocation corresponding to the number of resources currently allowed to be used. Job j gets a baseline assignment Aj=M/K, where M is the number of computers in the cluster and K is the number of jobs running. In order to further improve the overall resource utilization of computing cluster, a preemptive scheduling strategy is introduced, that is, to set a certain task high-low priority, high-priority tasks may preferentially occupy resources, the same level of priority may not mutually preempt resources. This effectively avoids a large occupation of resources by some low priority tasks, resulting in reduced efficiency.

It should be particularly pointed out that the various operations in the various embodiments of the automatic driving simulation task scheduling method described above may be crossed, replaced, added, or deleted, and therefore, the conversion of these reasonable permutations and combinations to the automatic driving simulation task scheduling method should also fall within the scope of the present disclosure, and should not limit the scope of the present disclosure to the embodiments.

Figure 2:
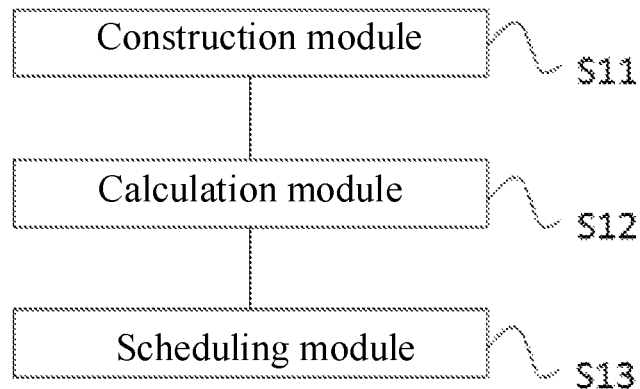
FIG. 2 is a schematic diagram of an embodiment of an automatic driving simulation task scheduling apparatus according to the present disclosure.

According to the above objects, in a second aspect of an embodiment of the present disclosure, an automatic driving simulation task scheduling apparatus is provided. FIG. 2 is a schematic diagram of an embodiment of an automatic driving simulation task scheduling apparatus according to the present disclosure. As shown in FIG. 2, an embodiment of the present disclosure includes the following modules: a construction module S11 configured to construct a network flow block diagram based on the cluster rack, the quantity of nodes and the quantity of processes, and encode information of the network flow block diagram; a calculation module S12 configured to set information of tasks to be simulated, and to perform simulation task flow minimum path calculation via a network flow block diagram; and a scheduling module S13 configured to update a scheduling system state in real time according to the fairness strategy and the preemptive scheduling strategy, and schedule based on the scheduling system state.

Figure 3:
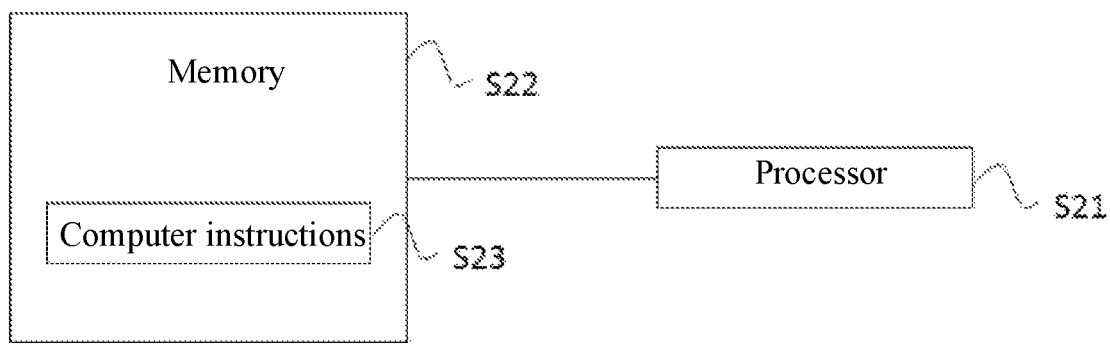
FIG. 3 is a schematic diagram of an embodiment of a computer device according to the present disclosure.

Based on the above object, in a third aspect of an embodiment of the present disclosure, a computer device is provided. FIG. 3 shows a schematic view of an embodiment of a computer device according to the present disclosure. As shown in FIG. 3, an embodiment of the present disclosure includes: at least one processor S21; and a memory S22 storing computer instructions S23 executable on a processor, which when executed by the processor carry out the operations of the above method.

Figure 4:
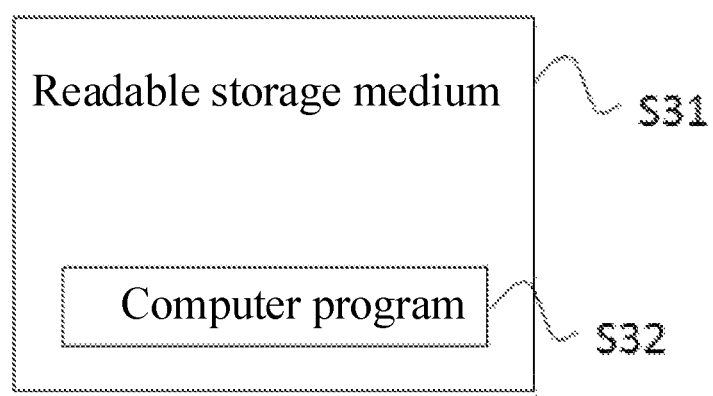
FIG. 4 is a schematic diagram of an embodiment of a computer-readable storage medium according to the present disclosure.

The present disclosure also provides a computer-readable storage medium. FIG. 4 illustrates a schematic diagram of an embodiment of a computer-readable storage medium according to the present disclosure. As shown in FIG. 4, the computer-readable storage medium S31 stores a computer program S32 which when executed by a processor performs the method as described above.

Finally, it should be noted that those skilled in the art may understand that all or part of the processes in the above embodiment methods may be realized by instructing related hardware through computer programs. The programs of the automatic driving simulation task scheduling method may be stored in a computer-readable storage medium. When the program is executed, it may include the processes of the embodiments of the above methods. Among them, the storage medium of the program may be magnetic disc, optical disc, read-only storage memory (ROM) or random storage memory (RAM). The embodiments of the above computer programs may achieve the same or similar effects as the corresponding embodiments of any of the above methods.

In addition, the method disclosed according to the embodiment of the present disclosure may also be implemented as a computer program executed by a processor, which may be stored in a computer-readable storage medium. When the computer program is executed by the processor, the above functions defined in the method disclosed in some embodiments of the present disclosure are executed.

In addition, the above method steps and the system unit may also be realized by using a controller and a computer-readable storage medium for storing a computer program that enables the controller to realize the above operations or unit functions.

Those skilled in the art will also understand that various exemplary logical blocks, modules, circuits, and algorithm steps described in connection with the disclosure herein may be implemented as electronic hardware, computer software, or a combination of both. In order to clearly illustrate the interchangeability of hardware and software, the functions of various schematic components, blocks, modules, circuits and operations have been generally described. Whether this function is implemented as software or hardware depends on the specific application and the design constraints imposed on the whole system. Those skilled in the art may implement functions in various ways for each specific application, but such implementation decisions should not be interpreted as leading to departure from the scope disclosed in some embodiments of the present disclosure.

In one or more exemplary designs, functions may be implemented in hardware, software, firm ware, or any combination thereof. When implemented in software, functions may be stored on or transmitted through a computer-readable medium as one or more instructions or code. The computer-readable medium includes a computer storage medium and a communication medium, which includes any medium that facilitates the transfer of a computer program from one location to another. The storage medium may be any available medium that may be accessed by a general-purpose or dedicated computer. By way of example and not limitation, the computer-readable medium may include RAM, ROM, EEPROM, CD-ROM or other optical disk storage devices, disk storage devices or other magnetic storage devices, or any other medium that may be used to carry or store required program codes in the form of instructions or data structures and may be accessed by a general-purpose or dedicated computer or a general-purpose or dedicated processor. Furthermore, any connection may be appropriately referred to as a computer-readable medium. For example, if coaxial cable, optical fiber cable, twisted pair, digital subscriber line (DSL) or wireless technologies such as infrared, radio and microwave are used to send software from a website, server or other remote source, the above coaxial cable, optical fiber cable, twisted pair, DSL or wireless technologies such as infrared, radio and microwave are included in the definition of media. As used herein, a disk and an optical disc include a compact disc (CD), a laser disc, an optical disc, a digital multi-function disc (DVD), a floppy disc, and a blue optical disc, among them, a disk usually reproduces data magnetically, while an optical disc reproduces data optically using a laser. The combination of the above contents shall also be included in the scope of computer-readable media.

The above is an exemplary embodiment of the present disclosure, but it should be noted that various changes and modifications may be made without departing from the scope of the embodiments disclosed in the claims. The functions, operations and/or actions of the method claims according to the disclosed embodiments described herein need not be performed in any particular order. In addition, although the elements disclosed in some embodiments of the present disclosure may be described or required in individual form, they may also be understood as multiple unless they are explicitly limited to the singular number.

It should be understood that, as used herein, the singular form "a" is intended to include the plural form as well, unless the context clearly supports exceptions. It should also be understood that "and/or" as used herein refers to any and all possible combinations including one or more items listed in association.

The above embodiments of the present disclosure disclose the serial number of the embodiments only for description and do not represent the advantages and disadvantages of the embodiments.

Those skilled in the art may understand that all or part of the operations to implement the above embodiments may be completed by hardware, or may be completed by instructing relevant hardware through programs. The programs may be stored in a computer-readable storage medium, which may be a read-only memory, a disk or an optical disk.

Those skilled in the art should understand that the discussion of any of the above embodiments is only illustrative and is not intended to imply that the scope of disclosure of embodiments of the present disclosure (including claims) is limited to these examples; under the idea of embodiments of the present disclosure, the above embodiments or the technical features in different embodiments may also be combined, and there are many other changes in different aspects of the above embodiments of the present disclosure, which are not provided in details for simplicity. Therefore, any omission, modification, equivalent replacement, improvement, etc. made within the spirit and principles of the embodiments of the present disclosure shall be included in the protection scope of the embodiments of the present disclosure.

The invention claimed is:

1. An automatic driving simulation task scheduling method, comprising:
    constructing a network flow block diagram based on a cluster rack, a quantity of nodes and a quantity of processes, and encoding information of the network flow block diagram;
    setting information of tasks to be simulated, and performing simulation task flow minimum path calculation via the network flow block diagram; and
    updating a scheduling system state in real time according to a fairness strategy and a preemptive scheduling strategy, and scheduling based on the scheduling system state.

2. The automatic driving simulation task scheduling method according to claim 1, wherein the network flow block diagram is configured such that a flow in the network begins at a vertex representing a task, passes through a plurality of directed edges representing the flow and edge costs, and a plurality of intermediate nodes representing jobs or physical machines, and finally enters a sink.

3. The automatic driving simulation task scheduling method according to claim 1, wherein the constructing a network flow block diagram based on a cluster rack, a quantity of nodes and a quantity of processes comprises:
    setting a root process node, a plurality of work process nodes and an unscheduled task node for each job, setting a computer node for each computer, and setting a rack node for each rack; and
    connecting the plurality of work process nodes and the unscheduled task node and the computer node and the rack node by directed edges.

4. The automatic driving simulation task scheduling method according to claim 1, wherein the encoding the information of the network flow block diagram comprises:
    encoding the cluster rack, a computer node and a process node in the network flow block diagram; and
    encoding the cost and weight of the directed edges in the network flow block diagram.

5. The automatic driving simulation task scheduling method according to claim 2, wherein the setting information of tasks to be simulated comprises:
    allocating flow to the directed edges such that a sum of the flow input by the plurality of intermediate nodes is equal to a sum of the flow output by the plurality of intermediate nodes; and
    setting a directed edge assignment cost weight according to scenarios, participants and sensor configurations of the automatic driving simulation task.

6. The automatic driving simulation task scheduling method according to claim 1,
    wherein the performing simulation task flow minimum path calculation via the network flow block diagram comprises:
    obtaining a minimum feasible flow solution based on a cost-scalable push-relabel algorithm, wherein a sum product of a flow cost of an output edge of the minimum feasible flow solution is minimum.

7. The automatic driving simulation task scheduling method according to claim 1, wherein the updating a scheduling system state in real time according to a fairness strategy and a preemptive scheduling strategy, and scheduling based on the scheduling system state comprises:
    making the high-priority tasks preferentially occupy resources according to the preemptive scheduling strategy; and setting an instantaneous resource allocation for a same-level priority tasks without preempting the resources of the same-level priority tasks according to the fairness strategy.

8. A computer device, comprising:
at least one processor; and
a memory for storing computer instructions executable on the processor which when executed by the processor, causes the processor to:
construct a network flow block diagram based on a cluster rack, a quantity of nodes and a quantity of processes, and encode information of the network flow block diagram;
set information of tasks to be simulated, and perform simulation task flow minimum path calculation via the network flow block diagram; and
update a scheduling system state in real time according to a fairness strategy and a preemptive scheduling strategy, and schedule based on the scheduling system state.

9. A non-transitory computer-readable storage medium, storing a computer program which when executed by a processor, causes the processor to:
construct a network flow block diagram based on a cluster rack, a quantity of nodes and a quantity of processes, and encode information of the network flow block diagram;
set information of tasks to be simulated, and perform simulation task flow minimum path calculation via the network flow block diagram; and
update a scheduling system state in real time according to a fairness strategy and a preemptive scheduling strategy, and schedule based on the scheduling system state.

10. The automatic driving simulation task scheduling method according to claim 2, wherein each of the plurality of directed edges in the network flow block diagram is designed with two variables including a capacity and an edge cost; and
the capacity is used to limit the flow of a simulation task flow through each edge for cost calculation, and the edge cost is used to constrain a simulation task.

11. The automatic driving simulation task scheduling method according to claim 2, wherein the method further comprises:
on the condition that a task starts running on a computer, adding an additional termination cost to the task on its side to all nodes except a node representing the computer in a cluster, wherein the additional termination cost increases with time and represents wasted resources when a penalty is forced to kill or move.

12. The automatic driving simulation task scheduling method according to claim 2, wherein an outgoing edge of each computer is provided with a unit capacity to allocate a maximum number of computers and a minimum number of the computers for running simulation tasks by controlling a capacity between an unscheduled task node and the sink.

13. The automatic driving simulation task scheduling method according to claim 6, wherein the cost-scalable push-relabel algorithm maintains a deviation from a minimum cost flow, and uses a continuous approximation method to solve.

14. The automatic driving simulation task scheduling method according to claim 6, wherein the cost-scalable push-relabel algorithm comprises pushing and relabeling;
the pushing is applied to an edge to press the pre-flow of a beginning of the edge into a sink, and the relabeling is applied to a point and sets a height of the point as a minimum value of heights of all adjacent points plus one.

15. The computer device according to claim 8, wherein the network flow block diagram is configured such that a flow in the network begins at a vertex representing a task, passes through a plurality of directed edges representing the flow and edge costs, and a plurality of intermediate nodes representing jobs or physical machines, and finally enters a sink.

16. The computer device according to claim 8, wherein the construct a network flow block diagram based on a cluster rack, a quantity of nodes and a quantity of processes comprises:
setting a root process node, a plurality of work process nodes and an unscheduled task node for each job, setting a computer node for each computer, and setting a rack node for each rack; and
connecting the plurality of work process nodes and the unscheduled task node and the computer node and the rack node by directed edges.

17. The computer device according to claim 8, wherein the encode the information of the network flow block diagram comprises:
encoding the cluster rack, a computer node and a process node in the network flow block diagram; and
encoding the cost and weight of the directed edges in the network flow block diagram.

18. The non-transitory computer-readable storage medium according to claim 9, wherein the network flow block diagram is configured such that a flow in the network begins at a vertex representing a task, passes through a plurality of directed edges representing the flow and edge costs, and a plurality of intermediate nodes representing jobs or physical machines, and finally enters a sink.

19. The non-transitory computer-readable storage medium according to claim 9, wherein the construct a network flow block diagram based on a cluster rack, a quantity of nodes and a quantity of processes comprises:
setting a root process node, a plurality of work process nodes and an unscheduled task node for each job, setting a computer node for each computer, and setting a rack node for each rack; and
connecting the plurality of work process nodes and the unscheduled task node and the computer node and the rack node by directed edges.

20. The non-transitory computer-readable storage medium according to claim 9, wherein the encode the information of the network flow block diagram comprises:
encoding the cluster rack, a computer node and a process node in the network flow block diagram; and
encoding the cost and weight of the directed edges in the network flow block diagram.

* * * * *